(12) United States Patent
Elliott

(10) Patent No.: US 6,868,338 B1
(45) Date of Patent: Mar. 15, 2005

(54) METHOD AND APPARATUS FOR RECORDING AND SYNTHESIZING POSITION DATA

(75) Inventor: Brig Barnum Elliott, Arlington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 361 days.

(21) Appl. No.: 10/026,181

(22) Filed: Nov. 19, 2001

(51) Int. Cl.[7] .......................... G01S 5/02; H04B 7/185
(52) U.S. Cl. .................. 701/213; 701/201; 701/207; 701/300; 340/990; 340/992; 340/995.1
(58) Field of Search ............................. 701/201, 207, 701/213, 300; 340/989, 990, 991, 992, 995.1

(56) References Cited

U.S. PATENT DOCUMENTS

| | | | | |
|---|---|---|---|---|
| 5,587,715 A | * | 12/1996 | Lewis | 342/357.03 |
| 5,913,170 A | * | 6/1999 | Wortham | 455/457 |
| 5,928,306 A | * | 7/1999 | France et al. | 701/207 |
| 6,002,982 A | * | 12/1999 | Fry | 701/213 |
| 6,115,655 A | * | 9/2000 | Keith et al. | 701/35 |
| 6,140,957 A | * | 10/2000 | Wilson et al. | 342/357.08 |
| 6,148,262 A | * | 11/2000 | Fry | 701/213 |
| 6,198,431 B1 | * | 3/2001 | Gibson | 342/357.07 |
| 6,327,533 B1 | * | 12/2001 | Chou | 701/207 |
| 2001/0053970 A1 | * | 12/2001 | Ford et al. | 704/9 |

FOREIGN PATENT DOCUMENTS

WO   WO 9309446 A1 *  5/1993   ............ G01S/5/00

* cited by examiner

Primary Examiner—Michael J. Zanelli
Assistant Examiner—Eric M. Gibson
(74) Attorney, Agent, or Firm—Ropes & Gray LLP

(57) ABSTRACT

A method and system for recording, synthesizing, distributing, and playing back position data includes a reference receiver having a known position, a mobile receiver having a variable position along a trajectory path, and a processor that calculates the trajectory path based on the reference receiver's position and the mobile receiver's position. The system generates a composite simulation dataset that displays the trajectory path in a virtual reality-like interactive display.

24 Claims, 5 Drawing Sheets

METHOD AND APPARATUS FOR RECORDING AND SYNTHESIZING POSITION DATA

TECHNICAL FIELD

The present invention relates to recording, synthesizing, distributing and playing back position data. More specifically, the invention relates to recording, synthesizing, and playing back position changes over a selected geographic area.

BACKGROUND OF THE INVENTION

Many people like to participate in various indoor and outdoor activities involving treks over a given geographic area. To share these activities with others, some record their experiences on video recording equipment for examination, demonstration, teaching, or comparison. Current video recording technology allows the participant to capture activities electronically during actual participation, but the recorded images are limited to the participant's perspective and cannot be viewed from other perspectives. There is also no way to record and view the participant's complete path along the geographic area from a third-person perspective.

There is a need for a system and method that allows accurate recording and playback of trajectory information over a selected geographic area. There is also a need for a system and method that allows a user to capture "virtual reality" datasets for activities over one or more trajectories, distribute the datasets electronically, and allow playback of the datasets from different visual perspectives, either alone or combined with additional trajectories and/or in varied terrain environments selectable by the user.

SUMMARY OF THE INVENTION

Accordingly, the present invention is directed to an apparatus and method for recording, synthesizing and distributing position data for later visualization of activities occurring on a given terrain. One embodiment of the invention is directed to a system for recording and synthesizing position data, comprising a reference receiver having a known position, wherein the reference receiver generates reference position data, a mobile receiver that has a variable position, wherein the mobile receiver generates raw position data, and a processor that generates trajectory path data based on the raw position data and the reference position data, wherein the trajectory path data corresponds to a trajectory path of the mobile receiver.

Another embodiment of the invention is directed to a system for recording and synthesizing position data, comprising a management station having a reference receiver with a known position and that generates reference position data, a location recording device having a mobile receiver and designed to be carried by a mobile entity, wherein the mobile receiver generates raw position data based on the entity's position, a processor that generates trajectory path data based on the raw position data and the reference position data, wherein the trajectory path data corresponds to at least one trajectory path of the mobile receiver, and an external device having an interface coupled with the processor to receive at least one of the raw position data, the reference position data, and the trajectory path data, wherein the external device further includes terrain visualization data corresponding a terrain, and wherein the external device combines the trajectory path data with the terrain dataset generated from the terrain visualization data to form a composite simulation dataset.

The invention is also directed to a system for synthesizing trajectory path data corresponding to a trajectory path and generated from reference position data obtained from a known position and raw position data obtained from a variable position data, the system comprising a data source having terrain visualization data for generating a terrain dataset, a processor for combining the trajectory path data with the terrain dataset to form a composite simulation dataset, and a display that displays the composite simulation dataset.

The invention is further directed to a system for distributing a composite simulation dataset generated from trajectory path data corresponding to at least one trajectory path, reference position data obtained from a known position, raw position data obtained from a variable position, and terrain visualization data, the system comprising a storage location that stores the composite simulation dataset, and an interface that allows a user to play back the composite simulation dataset.

DETAILED DESCRIPTION OF THE PREFERRED EMBODIMENTS

Figure 1:
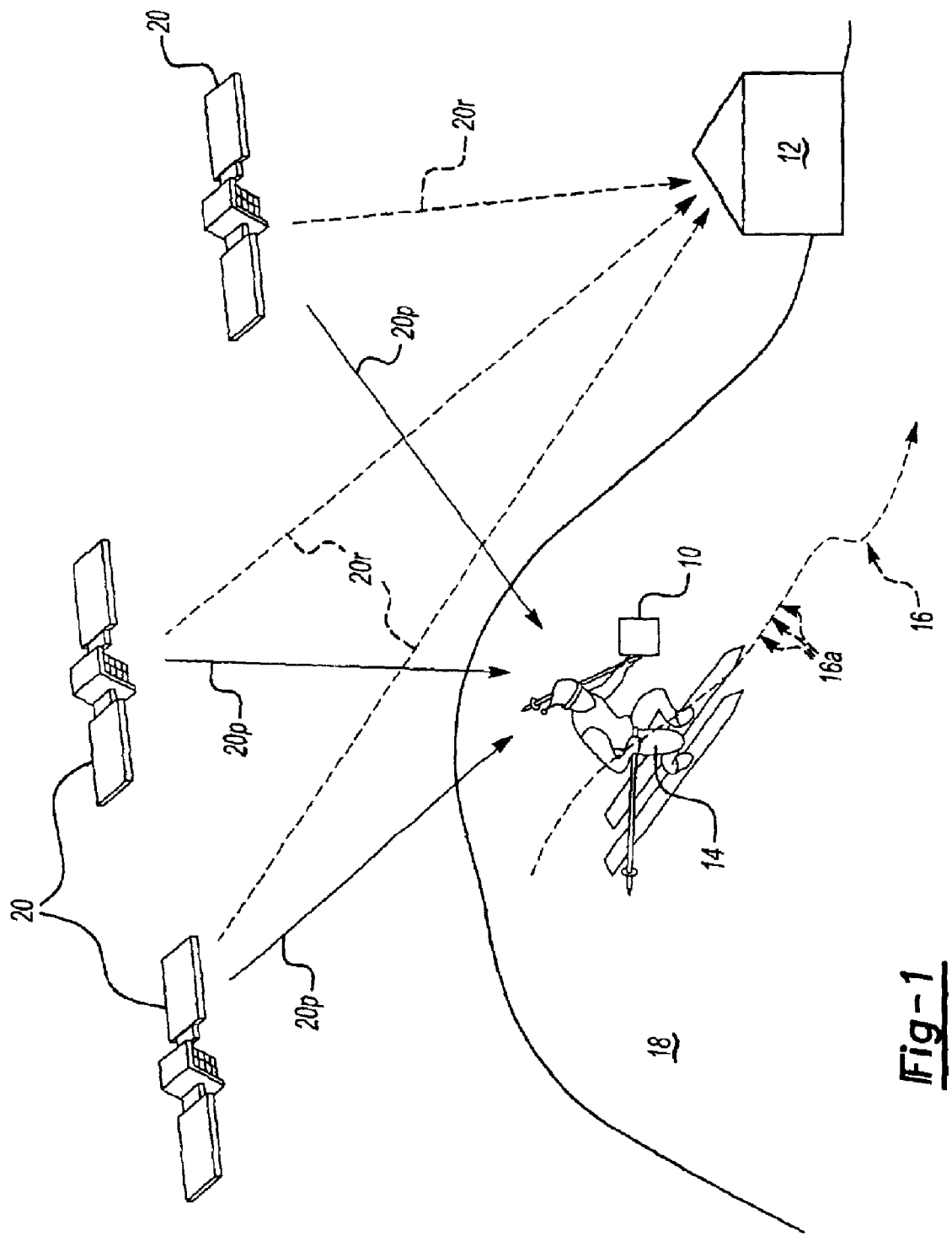
FIG. 1 is a representative diagram of the inventive system.

FIG. 1 is a representative diagram of a system for synthesizing position data corresponding to a trajectory path according to the present invention. The system includes a location recording device 10 and a management station 12. A participant 14 may wear or hold the location recording device 10 while traveling along a trajectory path 16 over terrain 18. GPS satellites 20 are shown in orbit in the earth's atmosphere and communicate with the location recording device 10 and management station 12. The location recording device 10 and management station 12 read and store position data from the GPS satellites 20 at different positions 16a. Although the current embodiment shows a trajectory path 16 over land, the trajectory path 16 can occur over any surface or through any medium, such as water, air, and ice.

Figure 2:
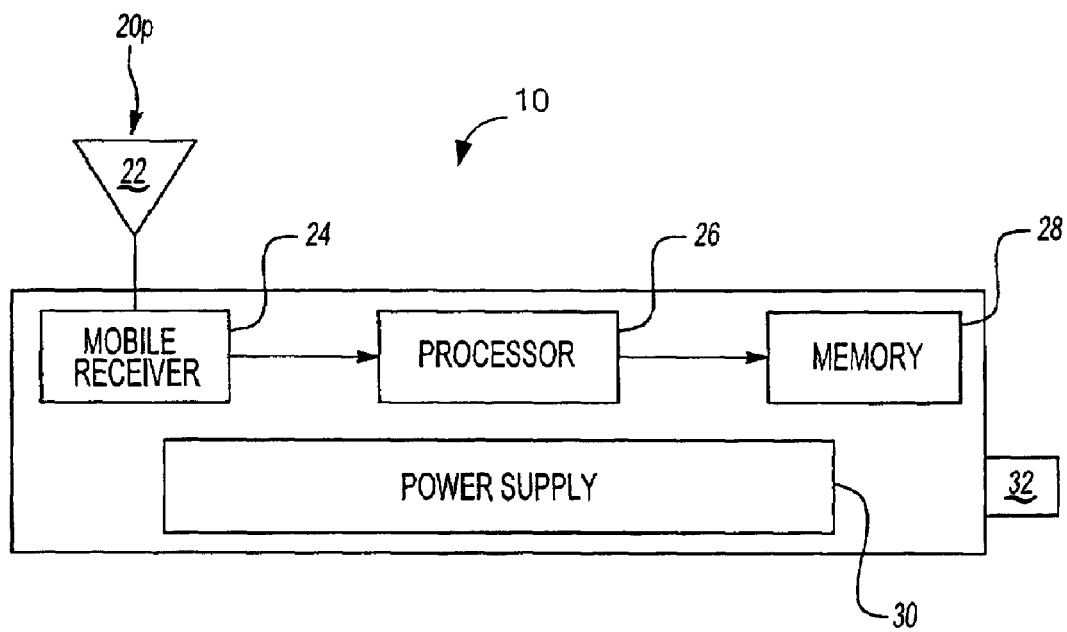
FIG. 2 is a block diagram of a location recording device in the inventive system.

FIG. 2 is a block diagram illustrating one embodiment of a location recording device 10 in the inventive system. The location recording device 10 includes an antenna 22, a mobile receiver 24, a microprocessor 26, a memory 28, a power supply 30, and an activation switch 32. The memory 28 can be any known data storage medium and can also be removable if desired. Alternatively, or in addition, the memory 28 can include an interface (not shown) that allows data transfer between the memory 28 and an external device via any known method. When the location recording device 10 is activated by switching the activation switch 32 to the "on" position, the microprocessor 26 executes a program that polls the receiver 24 for raw position data 20p sent to the mobile receiver 24 from the GPS satellites 20. The location recording device 10 may also include an optional microphone and/or video camera (not shown) to record audio and/or video data simultaneously with the raw position data 20p.

In one embodiment, the system uses a "global positioning system" (GPS) technique to produce trajectory path data corresponding to the trajectory path 16. The GPS technique can produce the trajectory path data with acceptable accuracy (e.g. within ten meters of the participant's exact location at a given time). However, greater accuracy may be achieved using an alternative form of GPS called differential GPS.

Differential GPS techniques can yield measurements accurate within several meters in both moving and stationary applications. The advantage of differential GPS over conventional GPS is its ability to capture accurate, as opposed to simply approximate, time and location measurements. Differential GPS uses two receivers to improve measurement accuracy: a stationary reference receiver having a known position, such as management station 12, for receiving multiple GPS satellite signals, and a mobile receiver, such as a location recording device 10 (shown in FIG. 1), having a variable position for recording a single position at any given time.

Generally, if the reference and mobile receivers are fairly close to each other (e.g. within a few hundred kilometers), the signals reaching both receivers will have traveled through the same atmospheric area and will have virtually the same errors. In the differential GPS method, the reference receiver measures timing errors and then provides correction information based on the timing errors to the mobile receiver. More particularly, because the reference receiver's location is already known, the reference receiver uses its known position data to calculate the signal timing of the GPS signals, which defines the relationship between the travel time of the GPS signals and the receiver's location. The reference receiver can then determine the difference between the calculated ideal signal travel time based on the reference receiver's known location and the actual detected signal travel time as an error correction factor. The reference receiver then uses the error correction factor to correct the mobile receiver's position measurements. The reference receiver may compute error correction factors for multiple satellites 20 (shown in FIG. 1) to correct errors from any satellite that the mobile receiver may use to calculate its position.

The differential GPS system described above can be applied to the inventive system as shown in FIG. 1. One or more GPS satellites 20 orbit the earth and communicate with the location recording device 10, which contains a mobile receiver, and the management station 12, which contains a reference receiver 48. As the participant 14 travels along the trajectory path 16, the location recording device 10 polls the GPS satellites 20 for raw position data 20p corresponding to the variable locations 16a of the location recording device 10. This permits the participant 14 to capture the different positions 16a of the location recording device 10 over time. As can be seen in the Figure, the different positions 16a collectively form the trajectory path 16.

If the system uses the differential GPS method, the location recording device 10 derives raw position data 20p from the GPS satellite readings. Because the GPS satellite readings alone may not be as accurate as desired, reference position data 20r from a fixed, stationary position can be used to calculate the error correction factors for generating differential GPS readings. The management station 12 polls the GPS satellites 20 for the reference position data 20r. A processor 26 (shown in FIG. 2) then corrects the raw position data 20p with the error correction signal obtained from the reference position data 20r to calculate the trajectory path data corresponding to a specific trajectory path 16. If the location recording device 10 records raw position data 20p corresponding to more than one trajectory path 16, the processor 26 will calculate discrete trajectory path data for each individual trajectory path.

Although differential GPS is one way to generate the trajectory path data, known inertial navigation techniques can also be employed as an alternative method. Like differential GPS, inertial navigation techniques can use a mobile receiver and a stationary all reference receiver, such as in the system shown in FIG. 1, to obtain trajectory path data corresponding to one or more trajectory paths 16. In a typical system using inertial navigation techniques to obtain position data, accelerometers in the mobile receiver determine translational motion by measuring inertial specific force, and gyroscopes in the mobile receiver determine orientation by measuring rotation in inertial space.

More particularly, inertial navigation techniques obtain the raw position data 20p based on accelerometer values to corresponding internal acceleration in the location recording device 10 and gravitational force distributed about the location recording device 10. The accelerometers measure a specific force expressed in an inertial reference frame set by the location recording device 10. A computer converts the position and velocity information from the accelerometer into a common coordinate system to allow integration of readings from different locations along the trajectory path 16. The gyroscope acts as a second internal sensor to conduct the common coordinate system conversion. The gyroscope defines the orientation of the reference axes in a global coordinate system through basic inertial navigation properties of rigidity and orientation in inertial space and through precession.

The accelerometers and gyroscopes can be packaged together as an inertial measurement unit. Two or three accelerometers measure specific force along a plurality of axes. For a complete sensor package, gyroscopes with three single degrees of freedom or a pair of gyroscopes with two degrees of freedom may be used. A computer (not shown) converts the inertial measurement outputs into the relative motion of the location recording device 10. In currently known systems, the computer performs integrations using digital quadrature algorithms. In some cases, integrating accelerometers and/or integrating gyroscopes perform one of the integrations by adding a damping term in their transfer functions.

The basic principle employed in inertial navigation is deduced reckoning. Deduced reckoning theoretically consists of adding differential displacement vectors. After the computer integrates the accelerometer reading over a time step twice, the result is the differential displacement of the location recording device 10 with respect to the terrain 18. The axes of the accelerometers move with the location recording device 10 as the displacement vectors inherently express the coordinate system, which rotates with the location recording device 10. To add vectors, they should all be expressed in a common coordinate system, and the common coordinate system should be fixed with respect to the reference frame. Therefore, the displacement vectors are transformed in a fixed coordinate system fixed with respect to the earth. The transformation may be conducted with the gyroscopes measuring the total rigid body of orientation of the location recording device 10. The gyroscopes measure the orientation of the accelerometer and physically or computationally resolve the differential displacement into a fixed global coordinate system before adding the vectors.

When applied to the system in FIG. 1, the management station 12 acts as an origin point, providing a local reference frame. Because the management station 12 is in a fixed location, its actual coordinates in the global reference frame (i.e. latitude and longitude) can be determined with high precision. The management station 12 then receives inertial navigation technique data from the location recording device 10 and determines the location recording device's 10 position relative to the management station 12.

The data obtained by the management station 12 from the location recording device 10 only provides the relative position of the location recording device 10 with respect to the management station 12. To plot the raw position data against the actual terrain, the raw position data is converted into the global reference frame based on the management station's position in the global reference frame. Because the management station 12 acts as the origin point in an inertial navigation system, converting the relative trajectory to the global reference frame involves applying the relative raw position data to the management station's 12 location in the global reference frame to plot the raw position data in the global reference frame.

Figure 3:
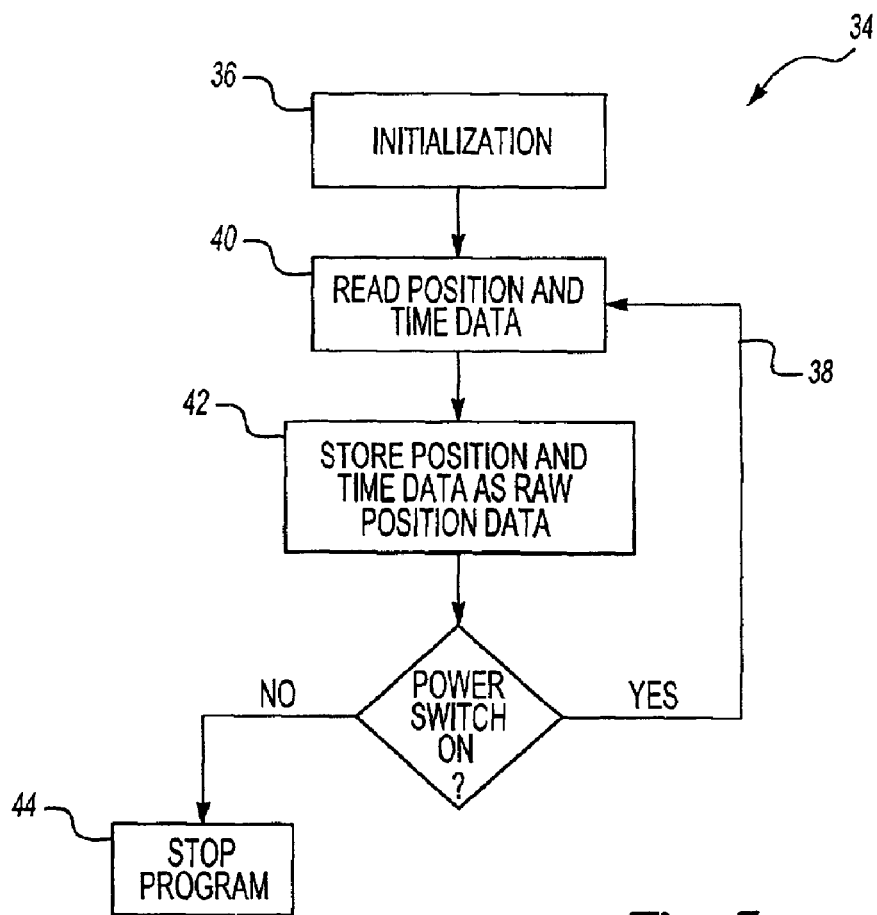
FIG. 3 is a flow chart of an algorithm used by the inventive system.

FIG. 3 is a flowchart 34 of an algorithm for reading and storing the raw position data 20*p*, such as position and time data, obtained by any of the techniques described above. The program 34 starts with an initialization step 36, then a loop cycle 38 for reading 40 and storing 42 position and time data until the program is externally stopped 44 by, for example, disconnecting the power supply 30 via the activation switch 32. The storing function 42 saves the raw position data (e.g., the position and time data for the trajectory path) in the memory 28. The program execution rate may be variable based on the resolution desired by the participant 14 if the velocity or acceleration rate of the trajectory path 16 is faster or slower. A faster execution rate will yield a more accurate reproduction playback because the program 34 stores position and time data more frequently and at more locations 16*a* along the trajectory path 16.

The activation switch 32 may also control operation of an optional video camera and microphone. The video data may be captured in the form of digital streaming video while audio data may be captured in analog form and converted to digital streaming audio by an analog-to-digital converter. The video and audio may be stored in the memory card 28 or in a separate video and audio data storing device (not shown) in the location recording device 10.

Figure 4:
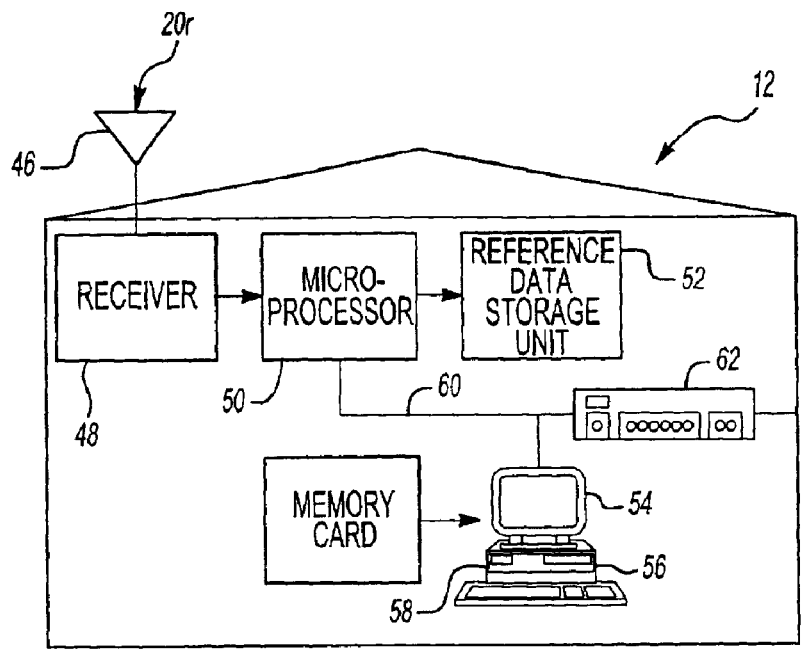
FIG. 4 is a block diagram of a management station in the inventive system.

FIG. 4 is a block diagram of the components of one embodiment of the management station 12. The management station 12 includes an antenna 46, a reference receiver 48, a microprocessor 50, and a reference data storage unit 52. The reference data storage unit 52 may be any storage medium, such as a hard disk or a hard disk drive. A program similar to the one seen in FIG. 3 executes a reading and storing function for reading and storing reference position data 20*r*. The storing function 42 saves the reference position data 20*r* in the reference data storage unit 52. The management station 12 may constantly collect reference position data 20*r* and not require any stopping of the program. Management station 12 may also include a workstation 54, a workstation memory 56, a memory interface 58, a local area network 60, and an internet router 62. The workstation 54 may be a computer or any other type of digital designing utility. If the memory card 28 (shown in FIG. 2) is a flash memory, the memory card interface 58 may be a Personal Computer Memory Card International Association (PCMCIA) adapter device to make the interface compatible with a wide variety of devices.

The location recording device 10 (shown in FIG. 2) and the management station 12 (shown in FIG. 4) start collecting position data once the participant 14 starts along the trajectory path 16 (shown in FIG. 1). The processors 26, 50 simultaneously poll the receivers 24, 48 of the location recording device 10 and management station 12 for raw and reference position data 20*p* and 20*r* respectively. The memory 28 and the reference data storage unit 52 store raw and reference position data 20*p* and 20*r* respectively. Position data 20*p* and 20*r* are synchronized at same times for different positions 16*a*. More particularly, each raw position 20*p* and reference position 20*r* is linked with a discrete time stamp. The participant 14 may select the management station 12 or a web-hosting site (not shown) to link the position data having the same time stamps. The management station 12 or web-hosting site produces a trajectory path data set (not shown) by linking each raw position 20*p* with a corresponding reference position 20*r* having the same time stamp as the raw position 20*p*.

Figure 5:
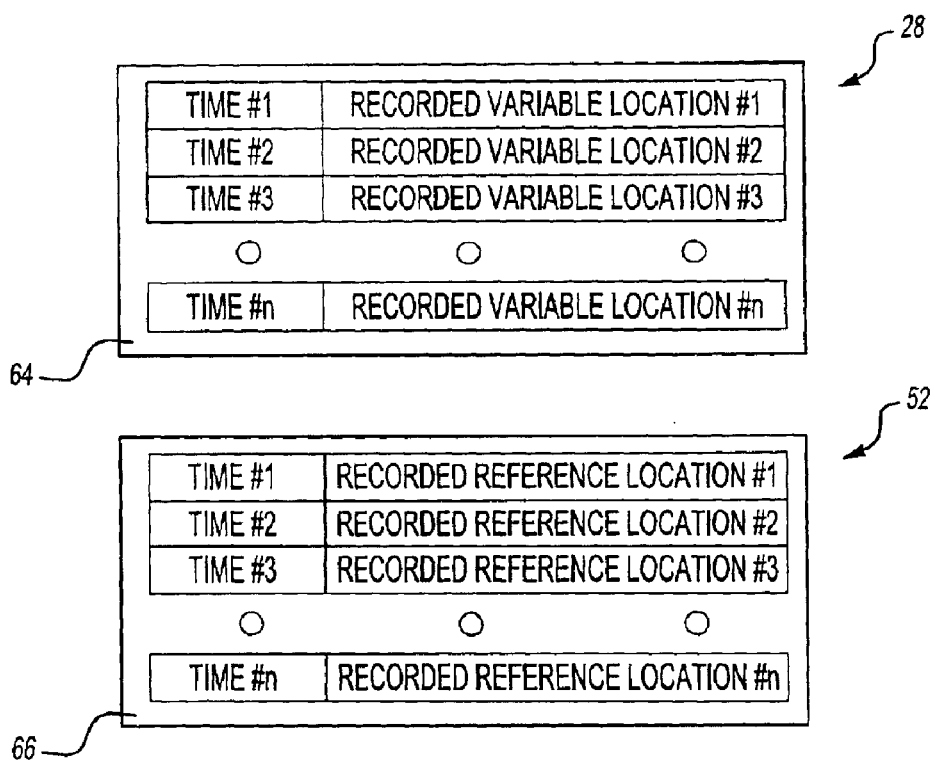
FIG. 5 is a representative diagram of data blocks generated by the invention.

FIG. 5 is a representative diagram of the data blocks captured simultaneously by a location recording device 10 and management station 12 representing series of raw position data and reference position data. The memory 28 in the location recording device 10 and the reference data storage 52 in the management station 12 each store a series of raw position data 64 or their corresponding reference position data 66, respectively, and their corresponding position data capture times 66. The position data and time data 64, 66 start at location and time 1 and end at location and time n. More particularly, each raw position and reference position is linked with a particular time stamp, which the system uses to link the raw position data 64 with its corresponding reference position data 66. The length of time over which the positions were recorded sets the specific value for n. If desired, the participant 14 may augment this data with other GPS information such as ephemeris data, that is, the number and identification of satellites in view that broadcast information to a terrestrial receiver.

Referring back to FIGS. 2 and 4, when the participant 14 finishes covering the trajectory path 16, the memory 28 in the location recording device 10 interfaces with the memory card interface 58 in the workstation 54 through any known means. For example, the actual interfacing process can involve wired or wireless transfer of the raw position data 20*p* to the management station 12 or physical removal of the memory 28 and insertion into the interface 58. The location recording device 10 itself may also be attached to the interface 58 without removing the memory 28. Regardless of the specific data transfer method, the workstation extracts the raw position data 64 from the memory card 28 and imports it into the workstation 54 for processing.

Figure 6:
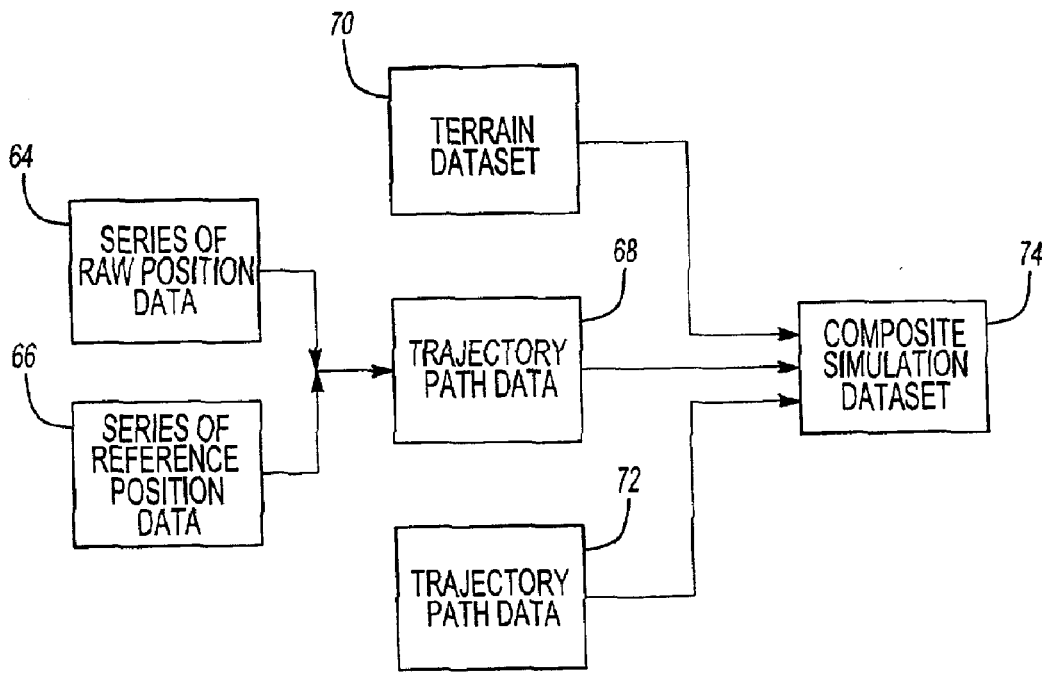
FIG. 6 is a block diagram of the production of the visualization data set.

FIG. 6 illustrates a block diagram of the processing and subsequent production of a composite simulation dataset 74. In this example, the workstation 54 combines a series of raw position data 64 and reference position data 66 by the differential GPS technique to create the trajectory path data 68. If the raw position data 64 is obtained by inertial navigation techniques, the same principles apply except for the specific processes used to generate the trajectory path data 68, as explained above.

To provide visual context for the trajectory path data 68, the system can combine the trajectory path data 68 with a terrain dataset 70 generated from terrain visualization data. The terrain visualization data 70 can be obtained from numerous known sources, including the U.S. Government. As shown in FIG. 6, the total composite simulation dataset 74, which includes the trajectory path data 68 and terrain dataset 70, can include trajectory path data corresponding to more than one trajectory path. In this example, the composite simulation dataset 74 contains trajectory path data 68, 72 corresponding to two trajectory paths. The memory 56 stores the trajectory path data 68, 72, the terrain dataset 70, and the corresponding composite simulation dataset 74 for later retrieval and playback as a video game-like interactive, virtual reality experience.

Figure 7:
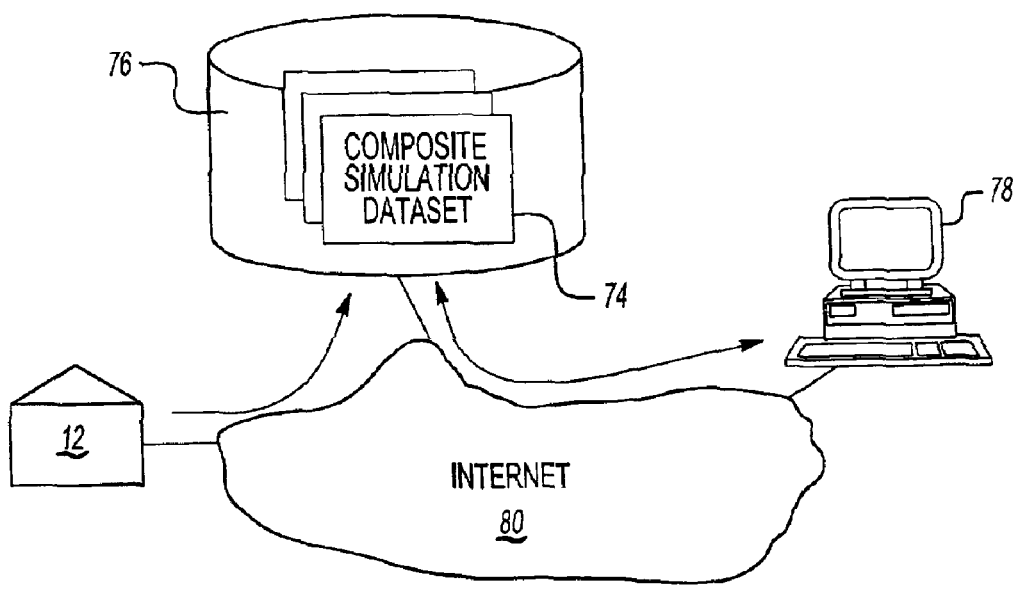
FIG. 7 is a representative diagram of a visualization data retrieval system.

One embodiment for retrieving and replaying the composite simulation dataset 74 is shown in FIG. 7. In this embodiment, the system generates the composite simulation dataset 74 from the trajectory path data 68, 72 for one or more trajectory paths by uploading the trajectory path data 68, 72 to a web hosting site 76 having access to the terrain visualization data, thereby eliminating the need to generate the composite simulation dataset 74 in the management station 12. By uploading the trajectory path data 68, 72, the web hosting site 76 can produce the composite simulation dataset 74 and allow the participant 14 to download the composite simulation dataset 74 to their personal computer 78 or to access the composite simulation dataset 74 via the Internet. The composite simulation dataset 74 may also be saved on a recording a medium, such as a CD-ROM.

The participant 14 may also distribute the composite simulation dataset 74 to others through various electronic channels. If the composite simulation dataset 74 is available on a web hosting site 76, the participant 14 can share his or her own travel experience by allowing remote users access to the composite simulation dataset 74. The remote users may access the participant's account with an appropriate password and download the composite simulation dataset 74 that the participant 14 has made available at the web hosting site 76. The composite simulation dataset 74 can also be offered on the recording medium or may be made available for downloading directly from the web site. The downloaded composite simulation dataset 74 can also be distributed to other people via electronic mail.

Figure 8:
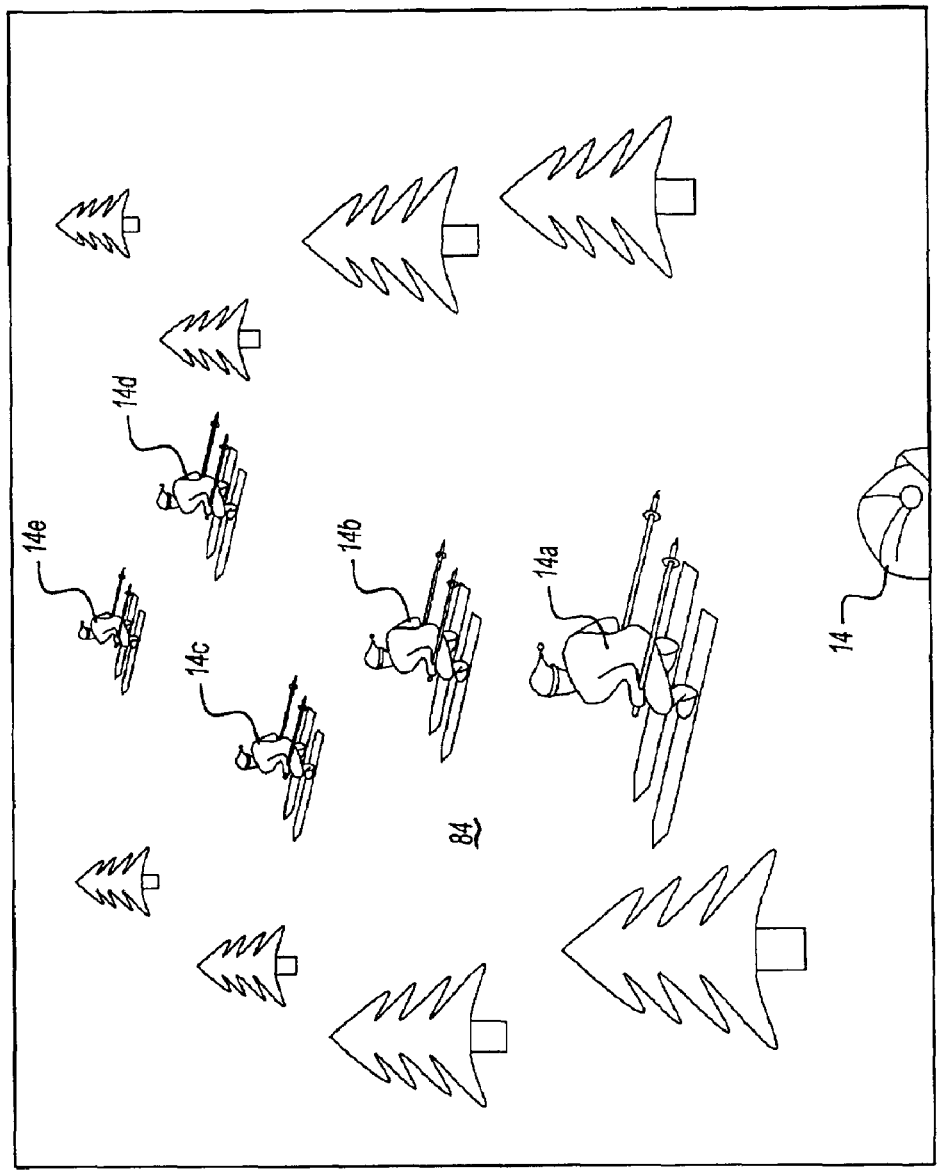
FIG. 8 is a representative diagram of a first-person perspective view of a virtual reality simulation generated by one embodiment of the invention.

The participant 14 or other people may then play back or otherwise navigate the composite simulation dataset 74 via any known data reproduction device, for example, on the workstation 54 at the management station 12 or on a personal computer 78. Because the composite simulation dataset 74 is made from digital data, the trajectory path 16 can be viewed from multiple views, perspectives and angles. An example of a skiing-related composite simulation dataset 14 being played back through the first person perspective 82 of a participant 14 is shown in FIG. 8. Other perspectives and angles for viewing or playing back the composite simulation dataset 74 may include a third-person perspective, such as views from above, from the side, or from behind. The first-person perspective view 82 may show the participant's 14 experience alone or may show a plurality of skiers 14a, 14b, 14c, 14d, and 14e skiing relative to the participant 14.

For example, a documented ski run may be played back from the first-person perspective 82. A user may choose skier 14e and decide to play back the composite simulation dataset from that skier's first-person perspective. A user may pivot the view at skier's 14e location and use this perspective to look backward at the participants 14, 14a, 14b, 14c, and 14d corresponding to other trajectories at a given instance. Skiers 14a, 14b, 14c, 14d, and 14e may represent other ski runs made by the participant 14 and provide visual comparison to other ski runs made on the same slope 84. Skiers 14a, 14b, 14c, 14d, and 14e may also represent ski paths recorded by other skiers, such as friends who have skied on the same slope (even if they had skied at different times) or professional skiers. In this embodiment, one may include their own ski run and play back his or her experience in the composite simulation dataset 74 without ever actually skiing against other skiers. Besides using the views referenced from the skiers on the slope 84, one may view one or more of the trajectory paths at one time in a third-person perspective, such as in a simulated overhead perspective.

The terrain visualization data 70 may also include environmental data to vary selected environmental conditions when displaying the composite simulation dataset 74. For example, the actual trajectory path down the ski slope 84 may be recorded during the winter, but the environmental data can be changed in the composite simulation dataset 74 during playback to appear as if the skier skied the slope during the summer. Weather conditions, seasonal conditions and other environmental factors may be simulated and changed by the environmental data. The environmental data can simulate real environments or even create fanciful, imaginary environments.

The inventive method and system can be applied to other activities such as hiking, rock climbing, sailing, soccer, ice hockey, swimming, football, basketball, polo, or any other activity where movement analysis is desirable. Further, the invention can be used in any application involving tracking, saving, comparing, and/or distributing trajectory information.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system for recording and synthesizing position data, comprising:

a reference receiver having a known position, wherein the reference receiver includes reference position data, and further wherein the reference receiver generates an error correction signal;

a mobile receiver that has a variable position, wherein the mobile receiver includes raw position data; and a processor that generates trajectory path data based on the raw position data and the reference position data, wherein the trajectory path data corresponds to a trajectory path of the mobile receiver, and further wherein the processor polls the reference receiver a plurality of times at a variable execution rate and generates a plurality of error correction signals, the variable execution rate being based at least in part on a desired resolution.

2. The system of claim 1, wherein the reference receiver receives at least one global positioning system (GPS) signal from at least one GPS satellite, and wherein the reference receiver generates the error correction signal as the reference position data corresponding to the GPS satellite based on the GPS signal.

3. The system of claim 1, wherein the error correction signal is a difference between an ideal GPS signal travel time and an actual GPS signal travel time, and wherein the processor generates the trajectory data by correcting the raw position data using the error correction signal.

4. The system of claim 1, wherein the reference position data describes the known position of the reference receiver in a global coordinate system, and wherein the raw position data describes relative positions between the reference receiver and the mobile receiver.

5. The system of claim 4, wherein the processor generates the trajectory path data by converting the raw position data from the relative positions between the reference receiver and the mobile receiver into the global coordinate system.

6. The system of claim 1, wherein at least one of the raw position data and the reference position data is a series of at least one of position data and time data.

7. The system of claim 1, further comprising a memory for storing at least one of the reference position data, the raw position data and the trajectory path data.

8. The system of claim 7, further comprising an external device having an interface that couples with the memory for downloading at least one of the reference position data, the raw position data and the trajectory path data to the external device, and
wherein the external device includes a display for generating a visual display of the trajectory path data.

9. The system of claim 8, wherein the external device includes an external device memory for storing a plurality of discrete trajectory path data corresponding to a plurality of trajectory paths.

10. The system of claim 9, wherein the external device further includes terrain visualization data corresponding to a terrain, and wherein the external device combines the discrete trajectory path data with a terrain dataset generated from the terrain visualization data to form a composite simulation dataset to be displayed on the display.

11. The system of claim 10, wherein the composite simulation dataset can be viewed from more than one viewing perspective.

12. The system of claim 8, wherein the external device further includes terrain visualization data corresponding to a terrain, and wherein the external device combines the trajectory path data with a terrain dataset generated from the terrain visualization data to form a composite simulation dataset to be displayed on the display.

13. The system of claim 12, wherein the composite simulation dataset can be viewed from more than one viewing perspective.

14. The system of claim 12, wherein the external device stores the composite simulation dataset at a storage location accessible via the Internet that allows viewing of the composite simulation dataset from a remote location.

15. The system of claim 12, wherein the external device stores the composite simulation dataset on a recording medium.

16. A method for recording and synthesizing position data, comprising the acts of:
generating reference position data corresponding to a known position for a reference receiver by polling the reference receiver a plurality of times at a variable execution rate, the variable execution rate being based at least in part on a desired resolution;

generating raw position data corresponding to a variable position of a mobile receiver; and generating trajectory path data based on the raw position data and the reference position data, wherein the trajectory path data corresponds to a trajectory path of the mobile receiver.

17. The method of claim 16, wherein the act of generating reference position data includes the act of receiving at least one global positioning system (GPS) signal from at least one GPS satellite and generating an error correction signal as the reference position data corresponding to each GPS satellite based on the GPS signal.

18. The method of claim 16, further comprising the step of combining the trajectory path data with a terrain dataset generated from terrain visualization data to form a composite simulation dataset.

19. The method of claim 18, wherein the terrain visualization data includes environment data corresponding to at least one environmental characteristic, and wherein the method includes the step of selecting at least one environmental characteristic during the combining step.

20. The method of claim 18, further comprising the step of providing more than one viewing perspective for the composite simulation dataset.

21. The method of claim 16, further comprising the step of storing the composite simulation dataset in a storage location.

22. The method of claim 21, wherein the storing step stores the composite simulation dataset in a storage medium.

23. The method of claim 21, wherein the storing step stores the composite simulation dataset in an Internet-accessible storage location.

24. A system for synthesizing trajectory path data corresponding to a trajectory path and generated from reference position data obtained from a known position and raw position data obtained from a variable position data, the system comprising:
a data source having terrain visualization data for generating a terrain dataset;

a processor for combining the trajectory path data with the terrain dataset to form a composite simulation dataset that can be viewed from more than one perspective; and a display that displays the composite simulation dataset;

wherein the processor combines trajectory path data corresponding to more than one trajectory path with the terrain dataset, the composite simulation dataset is displayed from the first-person perspective, and wherein the display represents said more than one trajectory path with the terrain dataset by displaying additional participants following said more than one trajectory path.

* * * * *